INVENTOR
PAUL W. HAMJY
BY Martin & Rendell
ATTORNEYS

May 6, 1941.  P. W. HAMJY  2,240,951

HEATING SYSTEM FOR BUILDINGS

Filed Oct. 26, 1939  3 Sheets-Sheet 3

INVENTOR
PAUL W. HAMJY
BY Martin & Rendell
ATTORNEYS

Patented May 6, 1941

2,240,951

UNITED STATES PATENT OFFICE 2,240,951

HEATING SYSTEM FOR BUILDINGS

Paul W. Hamjy, Utica, N. Y., assignor to International Heater Company, Utica, N. Y., a corporation of New York Application October 26, 1939, Serial No. 301,313

18 Claims. (Cl. 237—1)

This invention relates to a heating system for buildings and particularly to a heating system which includes constructing the building so that radiant heat will be directed downwardly from a plaster or other suitable heat conducting ceiling by means of the ceiling having constructed therein main air passages into which heated air is forced at one end and withdrawn at the other end of said passages; said construction also including insulation above said air passages to prevent the heat from going up to the floor proper.

The purpose of this invention is to provide a heating system for buildings of the type briefly outlined above and which system is of new, improved and effective construction.

A further purpose is to provide a warm air system of heating buildings in which system the plaster or other suitable or equivalent heat conducting ceiling is made the medium of transmitting the heat from heated air supplied immediately above said ceiling to the said ceiling so that the heat may radiate downwardly from the lower face of said ceiling to the room below said ceiling, and with said system having new and specially effective means for heat insulating the said air passages immediately thereabove so as to prevent the heat from being transmitted to the floor portion of the combined ceiling and floor.

Heretofore some buildings have been provided with passages in the walls of the building and in some cases with passages in the floors of the building into which passages there has been introduced heated air as a means of heating the adjacent rooms. The heating of buildings by means of heating the floors thereof is generally admitted to be objectionable for the reason that in order to provide sufficient heat for the rooms the floors have to be heated to such an extent that the floors are uncomfortably hot against the feet of the occupants of the building. The practice of providing warm air conduits in the hollow walls of buildings is wasteful of heat in that the outside walls, which would receive most heat, transmit the heat to the outside layer of such hollow walls and so waste the heat by endeavoring to heat up the outer layer of such outside walls, which obviously does not heat up the inside of the building but dissipates the heat into the atmosphere surrounding the building.

A further purpose is to provide a warm air or heated air system of heating buildings that is especially adapted to being used with buildings of the present type of wooden frames and wooden joists supporting the floors of the building and having attached below said joists the usual plaster ceiling or other proper ceiling. One purpose of this invention is to apply to such joist-supported floors further economical and effective means for providing horizontally arranged transversely extending air passages below said joists and means for supporting the ceiling below said air passages and means for supporting in the spaces between said joists suitable insulation for preventing the heat from passing upwardly into the floor proper.

A further purpose of this invention is to provide a building construction wherein a series of main air-conducting passages are provided below the joists or other members for supporting thereabove the floor proper and means are provided for supporting in the passages between the joists or other floor-supporting members a layer or body of heat insulation for preventing the heat from passing upwardly through said spaces between the joists to the floor proper supported by said joists, and wherein means such as a delivery chamber or delivery manifold are provided at one end of said series of air passages and also means are provided such as a return air manifold for collecting the used air at the return end of the said air passages and suitable ascending air-conducting stacks are provided for conducting the heated air to said delivery chamber or manifold and suitable descending return stacks are provided for conducting the used air from the said return chamber or manifold down to the air heating apparatus where said air may be reheated ready to be sent up again through the ascending air delivery stacks; means in such a system being also provided for forcing said air upwardly to the main air passages as by a fan, blower or pump or equivalent positive mechanical means conveniently in the lower part of the system or adjacent to the heating apparatus.

A further purpose of this invention is to provide a heating system and a building construction utilizing the conventional joist-supported floors but with the addition below said joists or close to the lower parts thereof, of an imperforate sheet or partition, preferably of sheet metal, which closes the bottom of the spaces between the joists and provides a support for the placing of a layer or suitable mass of heat insulating material in the spaces between said joists and reaching regularly from joist to joist, and with the further addition to the foregoing described structure of spaced depending spacers conveniently formed of strips of sheet metal having their upper edges bearing against said imperforate sheet metal partition and secured thereto as by nails or other fastening members extending through horizontal flanges at the upper edge of said spacers through said imperforate metal plate into the lower portions of the said joists, the space between said depending members forming the sides of a series of horizontally arranged main air passages and with the addition thereto of suitable wire or metallic lath secured by proper means to the lower edges of said depending spacers and finally with the addition to said metal lath of a suitable layer of plaster or equivalent plastic material to close the lower sides of said main air passages and form the means of receiving or absorbing the heat from said heated air and in turn radiating said heat downwardly from the lower face of said plaster ceiling to the room below, it being understood that said depending spacers do not quite reach to the ends of the several ceilings of the rooms but have their two ends or terminals spaced away from such side walls or extremes of the ceiling and thus provide chambers at the opposite ends of said air passages, the chamber at the air-receiving end of said passages forming the delivery manifold for said air passages and the chamber at the other end of said main air passages forming the return air manifold for collecting the returning used air and delivering it to suitable descending return air stacks, and that ascending air stacks similarly connect to the delivery manifold for conducting the heated air to the first or receiving end of the main air passages.

Further purposes are to provide a heating system wherein heat is radiated and the heating medium is warm air, thereby obtaining the following advantages:

Heated air can be more easily and safely transported within a building than hot water or steam, and when the heat is radiated there is required no unsightly heating equipment used only part of the year and no floor- or wall-wasting radiators or registers are needed; no currents of air are created within the room to cause dirt streaked walls, the heating medium does not tend to rust out or freeze and cause breakage and leaks and thereby damage to the walls, floors or ceilings; air passages are much lighter than pipes or water conveying members and can be left without attention in the spring when the heating operation is stopped and can be put into service without water or steam testing attention such as is necessary with water or steam: Further, water or steam pipes expand appreciably when heated and if in intimate contact with adjacent or surrounding material, as plaster, the plaster would be cracked and damaged.

Fig. 4 is a side elevation of a part of the orifice strip used at the incoming air end of the main air passages to properly control and distribute the ingoing air. Fig. 4—A is a side elevation of another part of the orifice strip where the orifices 36 are smaller than those shown in Fig. 4, and Fig. 4—B is a side elevation of another part of the said orifice strip where the orifices 36 are larger than those shown in Fig. 4.

Figure 1:
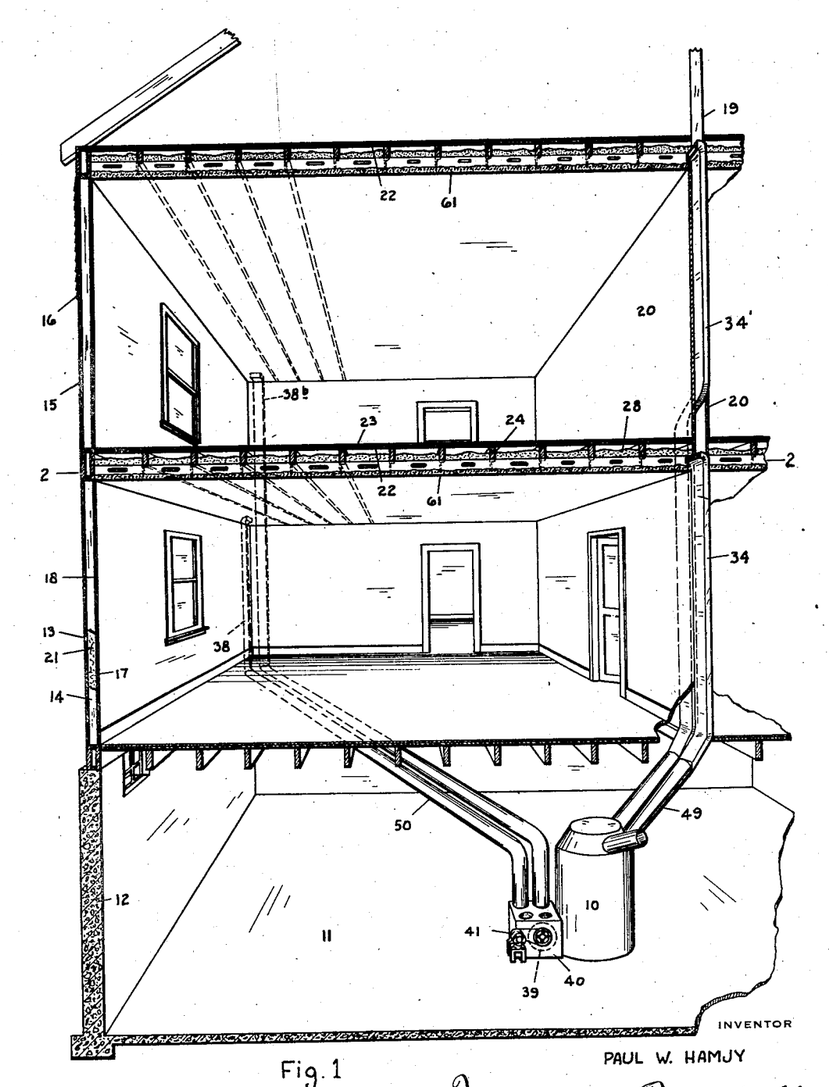
Fig. 1 is a perspective view of part of a frame house equipped with one embodiment of my present invention of heating system, a part of the basement being shown and also one room on the first floor and one room on the second floor of the house, the forward part of the house being cut away mostly in a vertical line substantially upon line 1—1 of Fig. 2.

Referring to the drawings in a more detailed description it will be seen that there is shown in Fig. 1 part of a conventional wood framed dwelling house wherein the warm air furnace 10 or other air heating apparatus is located in the basement 11 of the house, with the basement walls 12 supporting in an ordinary way the outside side walls 13 composed of the usual upright studs 14, siding 15 or the equivalent, and exterior clapboards 16, or other exterior finishing layer, with an interior finish of any conventional material, as for example plaster board 17, between which and the studs, however, there is interposed a vapor-proof paper 18. The interior partitions are supported in the ordinary way not necessary to be described and are composed of spaced upright studs 19, and on both faces of said walls a plaster board or equivalent layer 20. For the purpose of greater conservation of heat in this house the spaces between the upright studs 14 in the exterior walls are filled with a mass of suitable insulation as 21.

The floors of this house, commonly consisting of the sub-floor boards 22 and the top or finishing floor 23 are supported in the usual manner by the conventional spaced joists 24.

The structure which includes the floor of the second story room and the ceiling of the first or ground floor room is like the structure which includes the floor of the third floor or attic and the ceiling of the second floor room, but for briefness and certainty in description only the structure which comprises the floor of the second story room and the ceiling of the first floor room will be described, it being understood that the part of the structure beyond the joists and flooring is new and constitutes the subject matter of this invention.

Referring now to said structure which includes the joists 24 which support the sub-flooring 22 and the finishing floor 23 of the second story room, it will be seen that there is shown in the drawings an imperforate layer or partition commonly and conveniently and preferably composed of wide strips of sheet metal such as galvanized iron 25 secured to the lower edges of said joists as by suitable nails 26, having their points thrust through the said sheets of galvanized iron 25 until the heads of said nails 26 bear against the lower face of said strips of galvanized iron 25. As a precaution against these strips of iron 25 when warm communicating too much heat to the lower edge of the wooden joists 24 there will be preferably interposed between the said lower edge of the said joists and the upper face of the said strips of galvanized iron 25, a strip of asbestos 27 or other suitable effective heat insulation. These strips may conveniently be preliminarily tacked on or fastened on by suitable adhesive so as to remain definitely in place while the wide strips of galvanized iron 25 are being secured in place. The successive wide strips of galvanized iron 25 will be overlapped to a proper extent or preferably interlocked by an S-cleat 62 so as to make a thoroughly imperforate partition or plate, which partition or plate supports permanently and securely a layer or proper mass of heat insulating material 28. It will be understood that the several masses of heat insulation 28 extend entirely from joist to joist, as to each space left between adjoining joists and serve to prevent the heat passing upwardly from the said galvanized iron plate. The wooden joists themselves are of course heat insulators. Conveniently and preferably this mass of heat insulation between adjacent joists will be from 4" to 5" in thickness or height, that amount being sufficient insulation to serve the purpose in hand; the remaining air space of 5" or 6" more or less between the joists above the heat insulation material 28 forms a further effective heat insulation in view of the upper surface of the said mass of heat insulation 28 never becoming warm enough to heat the air in these air spaces between the upper parts of the joists.

To the bottom of the combined floor and ceiling structure just above described there is then secured a series of Z-shaped spacing strips 29. These spacing strips will conveniently and preferably be formed of thin sheet metal of the proper gauge for the purpose in hand and are provided with an upper flange 30 extending at substantially right angles to the body of said strip and forming the means for conveniently securing as by nails 31, the said strips to the just described floor structure. Where these spacing strips are to extend in the same direction as the joists 24 they will be spaced apart substantially the same distance as are the said joists and the upper flanges will then be below and in line with the several joists and the fastening nails 31 may therefore be placed as close together as desired along a joist and extended up thereinto. Practically, the heads of the nails 26 used to fasten the galvanized iron strips or plate 25 in place, will indicate the line of the joists at this time even though the joists be covered from view by the said iron plate 25.

If however, the best or more convenient form of installing these spacing strips 29 require such strips to extend transversely of the joists they may be and often will be so placed, and the strips will still be fastened to the overhead joist by putting one or more nails 31 through the upper flange 30 of the strip 29 at each intersection of a strip with the joist. As already intimated these spaced strips 29 form the side walls of a series of air passages 32 extending either lengthwise or cross-wise of the ceiling.

Figure 2:
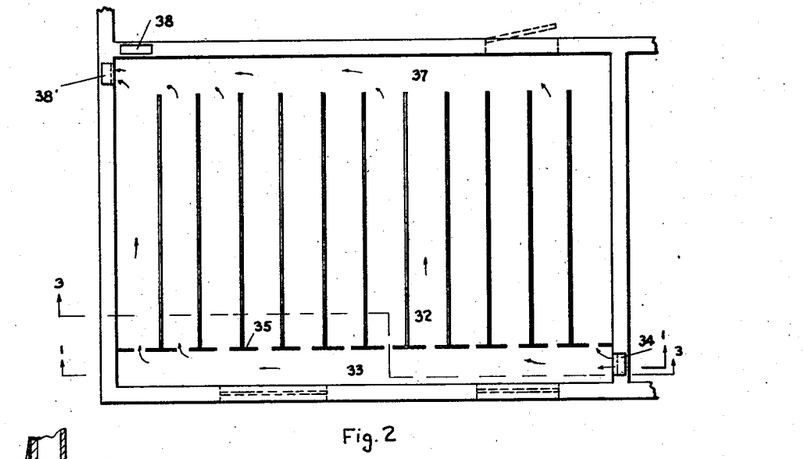
Fig. 2 is a diagrammatic sub-floor plan as on line 2—2 of Fig. 1.

As will be seen best by an inspection of Fig. 2, which is a horizontal sectional view through a whole series of these spacing strips placed in the ceiling above one room, the ends of said strips do not extend the full distance across the room or ceiling but terminate at both ends short of the adjacent side of the room or edge of the ceiling. This is purposely arranged so that along one boundary of the ceiling, say at the side where the heated air under pressure is to be admitted to the air passages 32, there will be a chamber of the proper width extending the length of the room and conveying the incoming heated air to adjacent ends of the air passages 32. This chamber, for purposes of definite and convenient description, I have called the delivery manifold 33, for the reason that it receives the incoming heated air from the upper end of the ascending stack 34 and conducts it along the adjacent ends of the passages 32 and this delivery manifold is so arranged and constructed, as will soon be seen, as to properly distribute or proportion the amount of heated air going to the several passages 32 so that the passages near the first end of the manifold, that is near the ascending stack, will not appropriate too much of the heated air and also so that a sufficient amount of heated air will be left to be distributed to the air passages 32 that open from the said delivery manifold towards the end of its length, that is towards its portion that is away from the ascending stack 34. This controlling and regulating feature of the delivery manifold is brought about by providing an orifice plate 35, conveniently being a strip of thin sheet metal as wide as the effective height of the spacing strips 29 and suitably secured in place opposite the ends of said strips 29 adjacent the delivery manifold. Fig. 4 shows a plan view or perhaps more properly a side elevation of part of such an orifice strip 35. As appears plainly from both Figs. 2 and 3, the portion of said orifice strip that is to be opposite an air passage 32 is provided with an orifice 36, which is of considerably less area than the whole portion of said strip opposite its air passage 32. Furthermore the orifices 36 near the ascending stack are appreciably smaller than those along through the central portion of the orifice strip and decidedly are still smaller than the orifices say at the last third or last quarter of the length of the orifice strip. Obviously these orifices could be of successively larger size by slightly increasing amounts at each portion opposite an air passage 32 but I have found that providing three or at most four sizes in these orifices is ample to secure the desired regulation and control of the heated air passing to the air passages 32 and to get a substantially even distribution of the heated air over the whole area of the ceiling and floor.

At the further or outlet end of the air passages 32 there is formed the return manifold 37 adapted to receive the air passing from this end of the several air passages 32 and conduct the same to a convenient descending stack 38. The exit ends of the air passages 32 require no orifice strip or other device regulating the movement of the air since by the time the air has reached the outlet ends of these passages it has given up its heat to the plaster ceiling below said passages as already suggested, and to be next described, and the purpose at this end of the passages is to receive the used air as freely as possible and pass it on to the descending stack 38 partly under the draft of the suction from the air fan or blower 39 located in the boot or other box-like extension 40 at the lower end of the furnace 10 and mechanically and power-driven as by an electric motor 41, and partly by the gravity of this now descending air and partly by the air pressure back of the used air.

Figure 7:
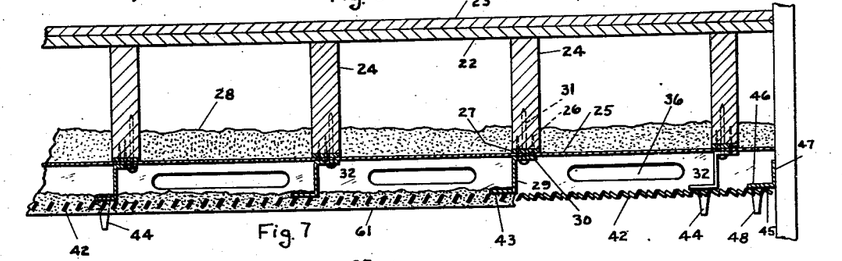
Fig. 7 is a sectional view through a portion of a combined floor and ceiling similar to the right-hand end of Fig. 3 but on a much larger scale, the right-hand portion being shown before the plaster is applied and even before the tongues 44 and 48 are turned over.

Stretching all the way across both lengthwise and laterally immediately below the lower edges of the spacing strips 29 there is placed and securely supported a layer of metal lath 42, as of expanded metal lath or similar mechanical equivalent. This metal lath 42 may be conveniently and preferably is secured to the lower portion of the said spacing strips by providing the lower part of the said strips with a lower flange 43 extending at right angles to the body of said spacing strips and conveniently extending in the reverse direction from the upper flange 30 of said strips so as not to be in the way of the workman when he is nailing said spacing strips to the joists thereabove, and by providing tongues 44 upon said lower flanges, which tongues are conveniently integral with said lower flanges and in fact most conveniently formed by pushing portions of the metal of said lower flanges outwardly and separated from the metal of said flanges along two sides and one end and connected thereto only at one end. Said tongues when the strips are manufactured will preferably be left projecting outwardly or downwardly from said lower flanges so that when the metal lath 42 is placed up against the said lower flanges of the metal strips the metal lath can be quickly and securely fastened in place to said spacing strips by turning over in one direction or the other said downwardly projecting tongues to be substantially in line with the lower flange and closely bearing against the bottom face of the metal lath. It will be understood that the metal lath not only extends below and bridges the spaces between the said spacing strips but is extended across the lower side of the delivery manifold and the lower side of the return manifold and secured to the adjacent portion of the wall of the room as by having its edge adjacent these two side walls of the room secured to the horizontal flange 45 of an angular-shaped strip 46 also used as shown in Fig. 7 and formed very much like the lower portion of a piece of a spacing strip so that it has a vertical flange 47 which may be nailed to the side wall of this portion of the room with the other flange 45 projecting outwardly on the line with the lower flanges of the said spacing strips. This lower flange 45 is formed with depending tongues therein 48 similar to the tongues 44 already described and operating to project through the metal lath pushed up thereagainst and then secure the metal lath in such position permanently by turning the tongues 48 to one side or the other against the lower face of the metal lath.

There is now secured to this metal lath a layer of plaster 61 forming a plaster ceiling. Ordinarily the portions of plaster that project up through the apertures in the metal lath tend to incline over the upper faces of the parts of the metal lath and form the means for holding the mass of plaster of the ceiling to the metal lath. These upwardly projected and ordinarily inclined portions of the plaster will form very rough and irregular faces or parts upon the upper part of the plaster and thus will provide above the metal lath and in the air passages 32 a much greater area of plaster than is the total cross area within any given air passage. This increased area of the upper portions of the plaster above the lath, together with the varying direction and the rough surface of these portions tends to break up the air passing through any given air passage from a straight current of air and operates to extract quickly and effectively the heat from the heated air and transfer it to the mass of plaster in the ceiling. The plaster with the metal lath imbedded therein both form good heat conductors so that the heat obtained from the heated air passing through the air passages 32 has to find its escape from the plaster by passing off from the lower face of the plaster ceiling in the form of radiant heat extending downwardly in the main but at least in some radiating direction into the room below the plaster ceiling.

As is well known, radiant heat waves pass through the air without heating it so the rays of such radiant heat do not simply heat up the air in the upper part of the room and form further currents of heat passing upwardly as would be the action of heat transmitted by conduction or convection from the lower surface of the plaster ceiling to the adjacent thin zone of air next thereto. On the other hand the rays of radiant heat press downwardly and operate to heat persons or furniture or parts of the room that come in contact with the rays and thus the persons occupying the room feel the radiant heat and are comfortable. Particularly the furniture in the room becomes warmed up by the radiant heat striking it and so it is comfortable to be contacted by the occupants of the room, such as chairs to sit on, tables to handle and beds to lie upon. Enough of the radiant heat extends to the floor and side walls of the room to properly heat those parts of the room and this, with the heat already transmitted to the furniture and the floor finally operates to warm to some extent the air in the room. This action of warming by radiant heat is much more comfortable and healthful to the occupants of the room than is the case with heating systems such as radiators or registers which warm the air by convection or where the air has already been warmed by hot air furnaces or other devices or systems. As long as the objects surrounding a human being are sufficiently warmed to prevent excessive radiant heat loss from the body greater comfort will exist in low air temperatures than if the air itself is warmed as by conventional means and the surrounding objects are at a relatively lower temperature.

It will be noted particularly that in my system the air to be heated is only the relatively few hundred cubic feet that occupy the air passages 32 of the house, the delivery manifolds 33, return manifolds 37, the ascending stacks 34, the descending stacks 38, the delivery conduits 49 in the basement or other furnace room for delivering the air from the furnace to the ascending stacks, and the return conduits 50 in the basement or other furnace room for returning the air from the descending stacks and the air-containing chamber of the boot 40 and the air-containing spaces or zones of the furnace 10, and not the total cubic contents of the rooms themselves, plus the air passages of air heating systems of that type. By reason of my system having to heat and move only a relatively few hundred cubic feet the said air can be heated much quicker and can be moved much quicker with less power and expense than systems that require the heating and moving of the total cubic contents of the house. Furthermore with my system of heating the occupants of the house are free to ventilate the separate rooms as they desire and to different extents as they desire, without feeling that they are wasting in an extravagant manner heat that has been produced by the heating system. Furthermore as by my system the heating of a house is entirely separate from the ventilation and the providing of fresh air therein, the heating system can be controlled by a thermostat, the thermometer unit of which is outside the buildidng and so controlled by the outside temperature of the atmosphere, instead of the ordinary system of a thermostat set within a building.

Figure 3:
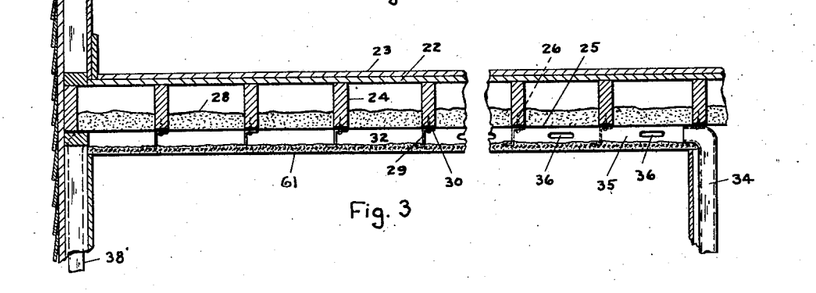
Fig. 3 is a vertical sectional view on line 3—3 of Fig. 2 but on a larger scale and with the middle portion of the combined ceiling and floor of Fig. 2 eliminated in order to show the rest of the floor on such larger scale.
Figures 4, 4A:
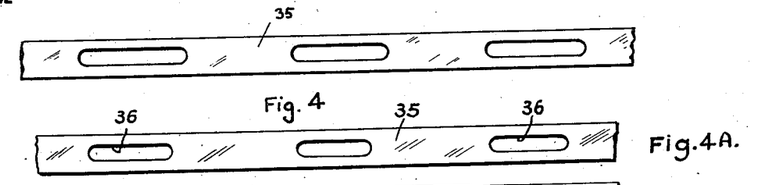
Figure 4B:
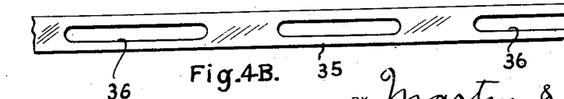
Figure 5:
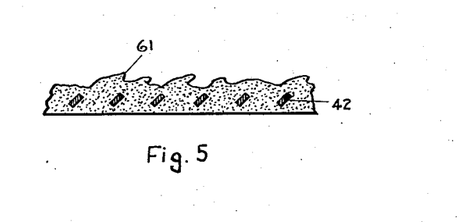
Fig. 5 is a detailed sectional view through a small portion of the perforated metal lath and the adjacent plaster ceiling supported thereby.

As is suggested in Figs. 1, 2 and 3 of the drawings showing the usual installation of my system of heating in a two-story house having a basement, it will be seen that I have shown the ascending stacks 34 for the heated air most conveniently and preferably located or housed within the space between adjoining studs in an interior partition. This arrangement conserves heat in that whatever heat is lost in going through the asbestos or other heat insulation on stack 34 passes into the interior walls where it helps to heat up adjoining rooms. On the other hand the delivery manifold 37 shown in Fig. 2 is along the most exposed side of the room, that is the side of the room which is an exterior wall and which commonly also has the further cooling elements of windows for lighting the room. The fact that this is an outside wall and has windows therein ordinarily in cold weather makes this side of the room decidedly cooler and therefore I place the delivery manifold over that side of the room so that the highly heated air as it comes into the delivery manifold may impart its highest or most intense heat to the plaster over that part of the room and so deliver downwardly a constant body of radiant heat rays which operates to warm up that side of the room to a greater extent than the other portions of the room. As shown in Fig. 2 the descending stack 38 for the return of the used air will preferably be placed at or near the diagonal corner of the room relative to the ascending supply stack 34. In this way the movement of the heated air through the whole series of connecting passageways 32 is equalized or made uniform; on the other hand as most of the heat has by that time been extracted from the air, that is has passed through the main passages 32, the return stack 38 may be placed in an exterior wall if more convenient, such as shown in the dotted line position 38' in Fig. 2.

The ascending and descending stacks for the ceiling of the second floor will also conveniently and preferably be relatively located as above described, that is the ascending stack as 34', for the ceiling of the second floor of Fig. 1, will pass upwardly in an inner partition but in another space between the studs than that used for the other ascending stack 34, and the descending stack 38ᵇ conducting the air from the ceiling of the second story room of Fig. 1 will preferably be placed in an interior partition as suggested in dotted lines in said Fig. 2, but in any event in a diagonally arranged corner of the room so as to equalize the movement of air through the whole set of air passages for the second story room ceiling. Obviously this stack if need be can be placed in an outside wall as by this time the heat has been very largely extracted from the air.

Figures 6, 8:
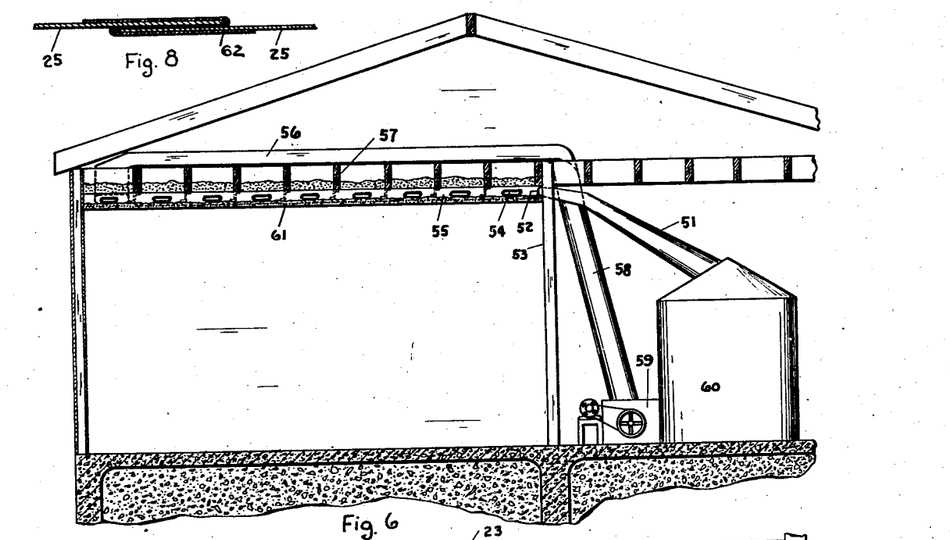
Fig. 6 is a vertical sectional view illustrating a modified form of my invention adapted for use for rooms on the ground floor of a house such as a basementless house where the warm air furnace or other air heating apparatus is located on the ground floor, and the attic is used for locating some of the conduits.
Fig. 8 is an edge view of an S-cleat of sheet metal used to unite two strips of sheet metal in an air-tight joint.

From Fig. 6 which is a showing of my system modified from the form shown in Fig. 1 to adapt the system for use with a one-story or bungalow type of basementless house where the furnace room is on the same level as the first floor rooms, it will be seen that the delivery conduit 51 to deliver the heated air under pressure to the delivery manifold 52, extending in more or less of a straight line from the upper part of the warm air chamber of the furnace and through the interior partition 53 to said delivery conduit 52, shown in said Fig. 6 as being at the near side of the room. From this delivery conduit the warm air is distributed through the various orifices 54 in the distributing strip 55 to the main warm air passages therebeyond in the usual way. At the farther end of these passages the used air from which the heat has been extracted is gathered into the return conduit on the farther side of this room and preferably from the end of said conduit, that is diagonally opposite the upper end of the delivery conduit 51, the air is lead upwardly into the return conduit 56, which is shown here as being placed just above the upper edges of the joists 57 which support this ceiling. As this view represents a house having an unfinished attic no floor boards are shown on top of said joists 57, but the conduit is placed on top of said joists and leads in a fairly direct line towards the upper end of the descending conduit 58, which conducts this used air back to the box 59 of the furnace 60. This upward movement of used air from the return manifold to the horizontal return conduit 56 and through said horizontal return conduit is entirely practical because the air in such a system is being moved by a pump or fan and so even cool air can be moved upwardly and longitudinally, especially when soon thereafter it is lead directly downwardly, as through the slanting descending conduit 58 to the furnace box 59.

What I claim as new and desire to patent is:

1. In a building construction, the combination of spaced joists, an imperforate sheet of material secured to said joists and closing at their bottoms the spaces between said joists, a layer of heat insulating material resting on said sheet of imperforate material and extending laterally from joist to joist, spaced parallel spacing strips depending from said sheet material, and forming the sides of a series of air passages extending in one direction across the ceiling, the said spacing strips terminating at their ends away from the adjacent edges of the ceiling and thereby forming at one side of the room a delivery manifold for conducting the air to said air passages and forming at the other side of the room a return manifold collecting the air from that end of the air passages, an ascending delivery stack for delivering warmed air to the delivery manifold, a descending conduit for conveying the air downward from the return manifold, and a ceiling of heat-conducting material secured to the lower edges of said spacing strips and closing the bottoms of said air passages and said manifolds, and from which ceiling the heat is radiated downwardly to the room below, an apertured control strip interposed between the delivery manifold and the adjacent inlet ends of the air passages, the apertures of said strip increasing in size as the strip extends away from the ascending delivery stack, means for forcing warmed air to said distributing manifold and means for conducting the air from the return manifold.

2. In a building construction, the combination of spaced joists, an imperforate sheet of material secured to said joists and closing at their bottoms the spaces between said joists, a layer of heat insulating material resting on said sheet of imperforate material and extending laterally from joist to joist, spaced parallel spacing strips depending from said sheet material, and forming the sides of a series of air passages extending in one direction across the ceiling, the said spacing strips terminating at their ends away from the adjacent edges of the ceiling and thereby forming at one side of the room a delivery manifold for conducting the air to said air passages, and a ceiling of heat-conducting material secured to the lower edges of said spacing strips and closing the bottoms of said air passages and said manifolds, and from which ceiling the heat is radiated downwardly to the room below, an apertured control strip interposed between the delivery manifold and the adjacent inlet ends of the air passages, means for forcing warmed air to said distributing manifold and means for conducting the air from the return manifold.

3. In a building construction, the combination of spaced joists, an imperforate sheet of material secured to said joists and closing at their bottoms the spaces between said joists, a layer of heat insulating material resting on said sheet of imperforate material and extending laterally from joist to joist, spaced parallel spacing strips depending from said sheet material, and forming the sides of a series of air passages extending in one direction across the ceiling, the said spacing strips terminating at their ends away from the adjacent edges of the ceiling and thereby forming at one side of the room a delivery manifold for conducting the air to said air passages and forming at the other side of the room a return manifold collecting the air from that end of the air passages, an ascending delivery stack for conducting warmed air to the delivery manifold, a conduit for conveying the air from the return manifold and a ceiling of heat-conducting material secured to the lower edges of said spacing strips and closing the bottoms of said air passages and said manifolds, and from which ceiling the heat is radiated downwardly to the room below, an apertured control strip interposed between the delivery manifold and the adjacent inlet ends of the air passages, the apertures of said strip varying in size in a predetermined manner as the strip extends away from the ascending delivery stack to effect a predetermined distribution of the warmed air in said air passages, means for forcing warmed air to said distributing manifold and means for conducting the air from the return manifold.

4. In a building construction, the combination of spaced joists, an imperforate sheet of material secured to said joists and closing at their bottoms the spaces between said joists, a layer of heat insulating material resting on said sheet of imperforate material and extending laterally from joist to joist, spaced parallel spacing strips depending from said sheet material, and forming the sides of a series of air passages extending in one direction across the ceiling, the said spacing strips terminating at their ends away from the adjacent edges of the ceiling and thereby forming at one side of the room a delivery manifold for conducting the air to said air passages and forming at the other side of the room a return manifold collecting the air from that end of the air passages, and a ceiling of heat-conducting material secured to the lower edges of said spacing strips and closing the bottoms of said air passages and said manifolds, and from which ceiling the heat is radiated downwardly to the room below, means for forcing heated air to said distributing manifold and means for conducting the air from the return manifold.

5. In a building construction, the combination of a floor, spaced joists supporting said floor, an imperforate sheet of material secured to said joists and closing at their bottoms the spaces between said joists, a layer of heat insulating material resting on said sheet of imperforate material and extending laterally from joist to joist, spaced parallel spacing strips depending from said sheet material, and forming the sides of a series of air passages extending in one direction across the ceiling, the said spacing strips terminating at their ends away from the adjacent edges of the ceiling and thereby forming at one side of the room a delivery manifold for conducting the air to said air passages, and a ceiling of heat conducting material secured to the lower edges of said spacing strips and closing the bottoms of said air passages and said manifolds, and from which ceiling the heat is radiated downwardly to the room below, and an apertured control strip interposed between the delivery manifold and the adjacent inlet ends of the air passages.

6. In a building construction, the combination of spaced joists, an imperforate sheet of material secured to said joists and closing at their bottoms the spaces between said joists, a layer of heat insulating material resting on said sheet of imperforate material and extending laterally from joist to joist, spaced parallel spacing strips depending from said sheet material, and forming the sides of a series of air passages extending in one direction across the ceiling, the said spacing strips terminating at their ends away from the adjacent edges of the ceiling and thereby forming at one side of the room a delivery manifold for conducting the air to said air passages and forming at the other side of the room a return manifold collecting the air from that end of the air passages, and a plaster ceiling secured to the lower edges of said spacing strips and closing the bottoms of said air passages and said manifolds, and from which plaster ceiling the heat is radiated downwardly to the room below, means for forcing heated air to said distributing manifold and means for conducting the air from the return manifold.

7. In a building construction, the combination of a floor, spaced joists supporting said floor, an imperforate sheet of material secured to said joists and closing at their bottoms the spaces between said joists, a layer of heat insulating material resting on said sheet of imperforate material and extending laterally from joist to joist, spaced parallel spacing strips depending from said sheet material, and forming the sides of a series of air passages extending in one direction across the ceiling, the said spacing strips terminating at their ends away from the adjacent edges of the ceiling and thereby forming at one side of the room a delivery manifold for conducting the air to said air passages, and a plaster ceiling secured to the lower edges of said spacing strips and closing the bottoms of said air passages and said manifolds, and from which plaster ceiling the heat is radiated downwardly to the room below, and an apertured control strip interposed between the delivery manifold and the adjacent inlet ends of the air passages.

8. In a building construction a plurality of spaced supporting members, a floor supported by said supporting members, a heat-conducting ceiling below and carried by said supports, a horizontal partition below said floor supports and above the ceiling, laterally extending spacers between said ceiling and said partition and forming air passages above the ceiling, means for forcing warmed air to one end of said passages and for conducting the air from the other end of the passages.

9. In a building construction a plurality of spaced supporting members, a floor of non-heat-conducting material above and supported by said supporting members, a heat-conducting ceiling below and carried by said supports, a horizontal partition below said floor supports and above the ceiling, laterally extending spacers between said ceiling and said partition and forming air passages above the ceiling, means for forcing warmed air to one end of said passages and for conducting the air from the other end of the passages.

10. In a building construction a plurality of spaced supporting members, a floor supported by said supporting members, a heat-conducting ceiling below and carried by said supports, a horizontal partition below said floor supports and above the ceiling, layers of heat insulation above said partition, laterally extending spacers between said ceiling and said partition and forming air passages above the ceiling, means for forcing warmed air to one end of said passages and for conducting the air from the other end of the passages.

11. In a building construction a plurality of spaced floor supports, a floor of low heat conductivity above said supports, a plurality of laterally-extending separated spacers projecting down from below the floor supports, a heat-radiating ceiling secured to the lower edges of said spacers and forming a series of air passages above said ceiling and means for conducting warmed air to one end of said passages and from the other end thereof.

12. In a building construction, a plurality of spaced floor supports, a floor of low heat conductivity above said supports, a horizontal partition below and carried by said floor supports, a plurality of laterally-extending separated spacers projecting down from said partition, a heat-radiating ceiling secured to the lower edges of said spacers and forming a series of air passages above said ceiling and means for conducting warmed air to one end of said passages and from the other end thereof.

13. In a building construction, a plurality of spaced floor supports, a floor of low heat conductivity above said supports, a horizontal partition below and carried by said supports, layers of heat insulation above said partition, a heat radiating ceiling spaced farther down from said supports, a plurality of separated spacers extending down from said partition to said ceiling and reaching nearly to the opposite sides of the room and forming a plurality of air passages extending across the room and forming a delivery manifold for leading warmed air to one end of said passages and a return manifold for collecting the air from the other end of the passages.

14. In a building construction, a plurality of spaced floor supports, a floor of low heat conductivity immediately above said supports, a horizontal partition below and carried by said supports, layers of heat insulation above said partition, a heat radiating ceiling spaced down from said supports, a plurality of separated spacers extending down from said partition to said ceiling and reaching nearly to the opposite sides of the room and forming a plurality of air passages extending across the room and forming at one end of said passages a delivery manifold for delivering warmed air to that end of said passages, the space beyond the other end of said spacers forming a return manifold for collecting the air at that end of the passages, an apertured control strip interposed between the delivery manifold and the adjacent inlet ends of the air passages, a conduit for supplying warmed air to the delivery manifold and conduits for conducting the cooled air from the return manifold, the apertures of said strip increasing in size as the strip extends away from the conduit conducting warmed air to the delivery manifold.

15. In a building construction, a plurality of spaced floor supports, a floor of low heat conductivity immediately above said supports, a horizontal partition below and carried by said supports, layers of heat insulation above said partition, a heat radiating ceiling spaced down from said supports, a plurality of separated spacers extending down from said partition to said ceiling and reaching nearly to the opposite sides of the room and forming a plurality of air passages extending across the room and forming at one end of said passages a delivery manifold for leading warmed air to that end of said passages, the chamber beyond the other end of said spacers forming a return manifold for collecting the air at that end of the passages, an apertured control strip interposed between the delivery manifold and the adjacent inlet ends of the air passages, a conduit for supplying warmed air to the delivery manifold and conduits for conducting the cooled air from the return manifold, the apertures of said strip varying in size in a predetermined manner to effect a predetermined distribution of the warmed air in said air passages.

16. In a building, the combination of a floor of relatively low heat conductivity, a ceiling of relatively high heat conductivity spaced down from said floor, a plurality of separated spacers carried by and projecting down from said floor to said ceiling and at their lower edges carrying said ceiling, said spacers forming a plurality of air passages extending across the room, means for delivering warmed air from a heating device to one end of said air passages, means for conducting the cooled air from the other end of said passages back to said heating device and an apertured control strip located across the inlet ends of said air passages for controlling the delivery of heated air to said air passages.

17. In a ceiling heating system for a building, the combination of a floor of relatively low heat conductivity, a plurality of separated spacers depending from said floor, a ceiling of relatively high heat conductivity carried by the lower edges of said spacers, said spacers extending across the room in one direction nearly to the sides thereof and forming a plurality of air passages, the chamber beyond one end of said spacers forming a delivery manifold leading the warmed air to that end of the air passages and the chamber beyond the spacers at the other end thereof forming a return manifold for collecting the air from that end of the passages, means for delivering warmed air from an air heater to said delivery manifold, means for conducting the cooled air from said return manifold to said air heater and an apertured control strip between the delivery manifold and the inlet ends of said air passages, the apertures of said control strip increasing in size as the strip extends away from the air supply.

18. In a ceiling heating system for a building, the combination of a floor of relatively low heat conductivity, a plurality of separated spacers depending from said floor, a ceiling of relatively high heat conductivity carried by the lower edges of said spacers, said spacers extending across the room in one direction nearly to the sides thereof and forming a plurality of air passages, the chamber beyond one end of said spacers forming a delivery manifold leading the warmed air to that end of the air passages and the chamber beyond the spacers at the other end thereof forming a return manifold for collecting the air from that end of the passages, means for delivering warmed air from an air heater to said delivery manifold, means for conducting the cooled air from said return manifold to said air heater and an apertured control strip between the delivery manifold and the inlet ends of said air passages, the apertures of said control strip varying in size in a predetermined manner to effect a predetermined distribution of the warmed air in said air passages.

PAUL W. HAMJY.

CERTIFICATE OF CORRECTION.

Patent No. 2,240,951. May 6, 1941.

PAUL W. HAMJY.

It is hereby certified that the above numbered patent was erroneously issued to International Heater Company, as assignee of the entire interest therein, whereas said patent should have been issued to the inventor, Paul W. Hamjy, and International Heater Company as assignee of one-half interest only in said invention, as shown by the record of assignments in this office; and that the said Letters Patent should be read with this correction therein that the same may conform to the record of the case in the Patent Office.

Signed and sealed this 10th day of June, A. D. 1941.

(Seal)

Henry Van Arsdale,
Acting Commissioner of Patents.